United States Patent Office 3,806,557
Patented Apr. 23, 1974

---

3,806,557
PROCESS FOR GRAFTING POLYSTYRENE BRANCHES ONTO POLYMERIC BUTADIENE OR ISOPRENE IN THE PRESENCE OF AN ALKYL LITHIUM OR SODIUM AND A SEC.-ALKYL CHLORIDE
Adel F. Halasa, Bath, Ohio, assignor to The Firestone Tire & Rubber Company, Akron, Ohio
No Drawing. Filed May 30, 1972, Ser. No. 258,038
Int. Cl. C08d 5/04; C08f 19/06, 19/08
U.S. Cl. 260—880 R      14 Claims

ABSTRACT OF THE DISCLOSURE

The process described herein involves a method of reacting styrene with a polymer of butadiene or isoprene in the presence of an alkyl lithium or sodium and a secondary alkyl chloride to effect the grafting of short branches of polystyrene and to prevent the formation of block copolymers which are otherwise formed.

BACKGROUND OF THE INVENTION

Field of the invention

This invention relates to the alkyl lithium-secondary alkyl chloride catalyzed grafting of styrene onto polymeric butadiene or isoprene. More specifically, it relates to such reactions in which short branches of polystyrene are grafted onto the polymeric butadiene or isoprene. Still more specifically, it relates to a process for avoiding the formation of block copolymers.

Related prior art

In the production of butadiene polymers for use in pneumatic tires, it has been found that diene polymers having low glass transition temperatures also have excellent wear properties. For example a polybutadiene having a glass transition temperature of −100 to −95° C. shows excellent wear characteristics when fabricated into tires. However the wet traction for such tires is very poor and generally whatever modifications are made to improve the wet traction have an adverse effect on the wear properties. For example if the butadiene is copolymerized with styrene, the wet traction improves as the styrene content is increased. Unfortunately, however, the wear properties are adversely affected as the styrene content is increased.

There are various patents which describe the polymerization of butadiene and isoprene with styrene catalyzed by alkali metal or alkali metal alkyl derivatives. In view of the great difference in the polymerization rate of butadiene or isoprene in comparison with that for styrene, more of the diene in this type of reaction polymerizes first and then as the concentration of styrene in the monomer portion is increased due to consumption of the diene monomer, the styrene is polymerized. Consequently the polymer molecules have a base portion predominantly of diene repeating units and a terminal portion predominantly of styrene.

For many purposes, it is undesirable to have the respective repeating units distributed in this block copolymer pattern, and it is more favorable for various desired properties that the styrene should be more uniformly distributed throughout the polymer molecule, such as in the styrene-butadiene rubber copolymers produced by emulsion polymerization. It would also be desirable to have a higher degree of branching throughout the copolymer molecules, to broaden the molecular weight distribution, to increase the molecular weight without production of gel, and to give better and improved processability.

Attempts to graft styrene onto polymeric butadiene or isoprene by the usual free radical method generally result in gel formation caused by uncontrolled crosslinking, and the formation of large terminal blocks of polystyrene.

Generally a "block" of repeating units is defined as a sequence or series of eight or more identical repeating units connected to each other. To avoid what is termed "blocks" it is desirable to have less than eight of such repeating units in sequence and preferably to have these shorter sequences distributed within or branched along the linear polymer chain.

STATEMENT OF THE INVENTION

In accordance with the present invention it has now been found that a polymer high in butadiene or isoprene content, preferably a diene homopolymer, and therefore having a very low glass transition temperature and accompanying excellent wear properties can have styrene added thereto with accompanying improvement in wet traction but without impairment of the wear properties. These improvements are effected by grafting onto a preformed polymer, preferably high in diene content, a plurality of short branches of polystyrene. These branches do not interfere with the vulcanizing and good wear properties of the base polymer and do improve the wet traction.

By the practice of this invention it has been found possible to add a plurality of side branches of polystyrene without destroying the elasticity of the original polymer and without producing gel. It has also been found possible to do this without forming an intolerable amount of styrene homopolymer. The styrene is added to the preformed diene polymer in the presence of an alkyl lithium, or active lithium already attached to the polymer, and a secondary alkyl chloride in appropriate amount to avoid the production of a substantial amount of styrene homopolymer which is formed in the absence of the appropriate amount of secondary alkyl chloride.

Up to 10% of homopolymer may be tolerated in the butadiene polymer product, although it is preferred that all of the styrene is grafted to the butadiene polymer. The efficiency of this grafting is improved by having 3–6 moles or more of secondary alkyl chloride per mole of lithium alkyl. If desired the styrene homopolymer may be extracted with acetone or other appropriate solvent, but it is more desirable to avoid formation of substantial amounts.

In accordance with the present invention, it has been found that a polymeric butadiene or isoprene can be reacted with styrene or other vinyl aryl to produce copolymers in which styrene or vinyl aryl repeating units are distributed as small branches attached to the diene polymer chain in contrast to having the styrene repeating units congregated in the terminal portions of the block copolymers that would otherwise result. Moreover, it is found that molecular weights are increased without the production of gel; there is a broader molecular weight distribution; and the products have improved processability as compared to the previously produced block copolymers.

While applicant does not wish to be committed to any particular theoretical explanation or mechanism by which the results of the invention are accomplished, it is believed that the secondary alkyl chloride or equivalent chloroalkane reacts with the lithium or sodium at the terminals of the polymer to remove the lithium or sodium as LiCl or NaCl leaving a primary allylic free radical at the end of the polymer and butyl free radicals wandering around in the polymer mass. The primary allylic free radical is less stable than a secondary allylic free radical so it has a tendency to exchange with or remove hydrogen on another polymer chain and thereby leave a secondary allylic free radical on a polymer chain further removed from the terminal. Moreover the butyl free radical also has a tendency to remove hydrogen from the polymer chains and also leaves a secondary allylic free radical somewhere along the length of the polymer. These free radical sites spaced along the length of the polymer apparently are the initiating sites for polymerization and grafting of the styrene or other vinyl aryl monomer. Since there are more of these resulting by this process along the length of the polymer than with the original number of terminal Li or Na atoms, the resultant polymer grafted chains are shorter, generally shorter than eight repeating units, and are distributed more uniformly along the chain and not at the terminals.

Preferred anionic catalysts for grafting the polymeric butadiene or isoprene for reaction with the styrene are alkyl lithium or sodium compounds. Preferably the alkyl groups have, for example, from 1 to 10, preferably 1 to 8 carbon atoms on which lithium or sodium has replaced hydrogen. Suitable alkyl lithium and sodium compounds include, for example, methyl lithium, ethyl lithium, butyl lithium, amyl lithium, hexyl lithium, 2-ethylhexyl lithium, n-dodecyl lithium, n-hexadecyl lithium and the corresponding sodium alkyls. Unsaturated lithium and sodium hydrocarbons are also operable, such as allyl lithium, allyl sodium, methallyl lithium, and the like. Compounds containing two or more lithium or sodium atoms per molecule such as dilithobutane, etc., are also suitable, such as disclosed in U.S. Pat. No. 3,317,918.

While the lithium or sodium may be attached to a primary, secondary or tertiary carbon in the alkyl group, primary groups are preferred such as in n-butyl lithium, n-butyl sodium, n-hexyl lithium, n-octyl lithium, etc.

Mixtures of such alkyl lithium and sodium compounds may also be employed. For example, desirable catalysts may be prepared by reacting an initial alkyl lithium or sodium compound successively with an alcohol and then with an olefin such as isopropylene (a technique analogous to the "Alfin" technique), whereby a greater or lesser proportion of the lithium or sodium from the initial alkyl lithium or sodium goes to form lithium or sodium alkoxide and to form a new organo-lithium or sodium compound with the olefin.

By the grafting reaction of this invention the polymers are improved in glass transition temperatures, for example raising them from —100 to —75° C., the processability and green strengths are improved, and the wear and tear properties when fabricated into tires are drastically improved.

The preformed polymers are advantageously grafted with styrene, etc., in the presence of the metal alkyl and the secondary alkyl chloride at temperatures between 0° C. and 100° C. A reaction temperature of from 30° to 50° C. is preferred. The reaction period is advantageously 0.5–8 hours preferably 1–6 hours.

The preformed conjugated diene polymers are preferably butadiene and isoprene polymers having at least 50% of the conjugated diene therein. In addition to the conjugated diene there may be up to 50% of a vinyl aryl compound copolymerized therein such as the mono-vinyl and mono-isopropenyl derivatives of benzene and naphthalene and nuclear substituted derivatives thereof in which such derivative groups have a total of no more than 12 carbon atoms and are alkyl, aryl, cycloalkyl, alkaryl or aralkyl groups.

The preformed polymer may be prepared by any polymerization method provided it may be purified to remove any catalyst residue, moisture, emulsifiers, etc., that will destroy or interfere with the catalysts used in the grafting reaction. For example, polymers prepared in an emulsion system are not desirable for this purpose because of the difficulty of removing the emulsifying agents used in the polymerization. These have an adverse effect on the catalysts used in the grafting reaction.

The polymer is preferably a rubbery polymer having a number average molecular weight, determined by dilute solution viscosity, of 30,000–120,000, preferably 50,000–100,000. The polymer may vary very broadly in the proportions of 1,2 and 1,4 configuration.

The grafting reaction is performed in solution, preferably in a hydrocarbon solvent, and advantageously with a polar component present such as tetrahydrofurane or other ether or a chelating amine such as tetramethyl ethylene diamine.

In the grafting reaction, the lithium or sodium alkyl is advantageously used in a proportion of 0.5–15 gram millimoles per 100 grams of preformed polymer, and the secondary alkyl chloride is used in a proportion of 5–25 millimoles per millimole of lithium or sodium alkyl.

The amount of vinyl aryl compound is advantageously 5–50 parts per 100 parts of preformed polymer. The preformed polymer is used in a 5–30 percent, preferably 15–20 percent solution.

Solvents operable in the grafting reaction are advantageously non-acidic, organic substances. Preferred solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene and the like are also operable.

Mono-olefins can also be used as solvents when a catalyst system is used for which the olefin is immune to polymerization. For example, as pointed out above, the alpha olefins are immune to polymerization with n-Bu lithium unless combined with a chelating compound such as symmetrical-dimethyl ethylene-diamine. Therefore, in the absence of such an effective catalyst system, olefins can be used as solvents, including butylenes, amylenes, hexenes, cyclohexene and the like. Polar compounds such as ethers and amines may also be present.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled.

As in the case of the monomer, the solvent, after being purified, desirably should be handled in contact only with its own vapor or with atmospheres containing only its vapor and inert gases such as helium and argon.

Laboratory scale reactions may conveniently be conducted in glass beverage bottles sealed with aluminum lined crown caps. The bottles should be carefully cleaned and dried before use. The catalyst employed may be added to the bottle by weight, or, where possible, the catalyst can be melted and added by volume. The removal of oxygen from the free air space above the solution in the bottle as well as dissolved oxygen in the solution is an important step in the bottle loading procedure. The cap is placed loosely on the bottle and the mass is brought to a vigorous boil as by placing the bottle on a heated sand bath. When approximately 10% of the charge has been vented, the bottle is rapidly sealed with a metal cap having two or three openings and a rubber liner. Such procedure substantially excludes the air and oxygen which drastically inhibit reaction.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the conditioning reaction is complete. The bottle is then cooled and the desired amount of styrene introduced through the rubber liner by means of a syringe. Then the bottle is reheated and maintained at the desired temperature for an appropriate period.

The time for the grafting operation varies with the temperature, the time required decreasing with increase in temperature, in any case being completed within 3-6 hours, and at the higher temperatures in the cited range substantial reaction is effected within one-half hour.

After the grafting has been completed, and the bottle cooled to handling temperature, the grafted polymer may be removed by cutting the bottle open.

Small and large scale reactions can also be run in stainless steel stirred reactors. Corresponding techniques are employed in large scale processes. Usually the reaction will be carried out in a closed autoclave provided with a heat transfer jacket and a rotary agitator. Avoidance of oxygen contamination is most easily secured by evacuating the vessel prior to charging the reagent solution and employing an inert atmosphere. To insure the purity of the vinyl aryl monomer and solvent, a silica gel or other suitable adsorption column is preferably inserted in the charging line employed for introduction of these materials to the reactor. The catalyst solution or suspension is preferably charged from an auxiliary charging vessel pressured with an inert gas and communicating with the reaction vessel through a valved conduit. It is desirable to provide a reflux condenser to assist in the regulation of the reaction temperature.

The various tests performed on the products are carried out according to standard procedures. The analysis for block polystyrene is made by oxidation with osmium tetraoxide according to the procedure published in Jour. Polymer Sci., vol. 1, No. 5, p. 429 (1946).

The invention is illustrated by the following examples. These examples are given merely for purposes of illustration and are not intended in any way to restrict the scope of the invention nor the manner in which it can be practiced. Unless specified otherwise, parts and percentages are given by weight.

EXAMPLE I

Seven 28-ounce polymerization bottles, cleaned and purged with nitrogen are each charged with 400 ml. of a hexane-butadiene blend containing 60 gm. of butadiene. Each bottle is sealed with a screw top having several openings covered by a rubber-aluminum foil liner. To each bottle there is introduced by hypodermic syringe 1.00 millimole of n-BuLi and then the bottles are maintained at 50° C. on a polymerization wheel for 14 hours. The resulting polymer solution is neutralized with the exact amount of methanol required to deactivate the amount of lithium originally added. (Neutralization is not necessary for the purpose of this invention but this is done to demonstrate that dead polymers may be used in the subsequent grafting operation.) Then to each bottle there is added 12 gm. of freshly distilled styrene, 0.5 millimole of n-BuLi and varying amount of secondary butyl chloride (S-BuCl) as indicated in the table below. The bottles are then placed on the polymerization wheel and maintained at 80° C. for 14 hours, following which the styrene homopolymer is extracted with acetone and the styrene content of the butadiene polymer is determined by infrared analysis or by nuclear magnetic resonance). The results are reported in the table:

TABLE

| Exp. | n-BuLi, nM. | S-BuCl, nM. | Styrene homopolymer, percent of total polymer | Percent styrene in copolymer | Total percent styrene found |
|---|---|---|---|---|---|
| 1 | 0.5 | 0.0 | 16.41 | 0.0 | 16.41 |
| 2 | 0.5 | 1.0 | 13.42 | 3.68 | 17.10 |
| 3 | 0.5 | 2.0 | 8.64 | 8.86 | 17.50 |
| 4 | 0.5 | 3.0 | 4.32 | 14.18 | 18.50 |
| 5 | 0.5 | 4.0 | 3.20 | 14.20 | 17.40 |
| 6 | 0.5 | 5.0 | 2.30 | 15.63 | 17.93 |
| 7 | 0.5 | 6.0 | 0.00 | 15.14 | 15.14 |

EXAMPLE II

The procedure of Example I is repeated a number of times using polyisoprene in place of polybutadiene, the proportions and conditions being as tabulated below:

Hexane _____grams__ 225
Polyisoprene (mol. wt. 100,000) _____do____ 75
Styrene _____do____ 25
n-BuLi _____millimole__ 1
Alkyl halide _____millimoles__ 10
Temperature _____° C__ 50
Reaction time _____hours__ 6

| Percent styrene | n-BuLi, nM. | Alkyl type | Halide, nM. | Percent Conv. | Gel | Block styrene |
|---|---|---|---|---|---|---|
| 25 | 0.50 | Control | 0.0 | 100 | 0.00 | 13.70 |
| 25 | 0.50 | Sec.-BuCl | 10.0 | 100 | 0.00 | 0.38 |
| 25 | 1.00 | t-BuCl | 10.0 | 100 | 0.00 | 11.20 |
| 25 | 1.00 | Sec.-amylCl | 10.0 | 100 | 0.00 | 0.22 |
| 25 | 1.00 | n-BuI | 10.0 | 100 | 0.00 | 10.24 |

EXAMPLE III

The procedure of Example I is repeated a number of times using individually in place of the n-BuLi of that example together with secondary butyl chloride equivalent amounts respectively of n-hexyl lithium, n-octyl lithium, n-BuNa, n-octyl Na, secondary butyl lithium, 3-octyl lithium, 3-amyl Na, t-butyl lithium and t-amyl lithium. Similar improvements in properties and low amounts of block polystyrene are noted as in Example I.

EXAMPLE IV

The procedure of Example I is repeated a number of times using individually in place of the styrene of that example together with secondary butyl chloride equivalent amounts respectively of vinyl toluene, isopropenyl benzene, vinyl naphthalene and vinyl diphenyl. Each product shows similar improvements in properties, and low amounts of block polymer are produced as in Example I.

EXAMPLE V

The procedure of Example I is repeated twice using in place of the polybutadiene, random copolymers of butadiene with 25% styrene, and of isoprene with 25% styrene. The products show similar improvements in properties, and low amounts of block polystyrene are produced as in Example I.

The invention claimed is:

1. A process for adding a plurality of short branches of vinyl aryl repeating units to a preformed polymeric diene selected from the class consisting of butadiene and isoprene containing at least 50 percent by weight of said diene comprising the steps of:

(1) adding a vinyl aryl compound to a hydrocarbon solution of said preformed diene polymer, said addition being prior to or simultaneous with the addition of an alkyl lithium or alkyl sodium and a secondary alkyl chloride selected from the class consisting of secondary butyl, secondary amyl and isopropyl chlorides, said alkyl lithium or alkyl sodium being used in a proportion of 0.5-15 millimoles of Li or Na per 100 parts by weight of said preformed polymer and said secondary alkyl chloride being used in a proportion of 5-25 millimoles per millimole of Li or Na, said vinyl aryl compound being added in a proportion of 5-50 parts by weight per 100 parts of preformed polymer, and said vinyl aryl compound being selected from the class consisting of styrene, alphamethyl styrene, vinyl naphthalene and vinyl diphenyl and nuclear alkylated derivatives thereof in which the alkyl derivative groups have no more than a total of 10 carbon atoms per molecule; and (2) reacting said vinyl aryl compound with said polymeric diene at a temperature of 0–100° C. for a period of 0.5–8 hours;

the diene polymer comprising 100–50 percent by weight of butadiene or isoprene and 0–50 percent by weight of a vinyl aryl monomer selected from the class consisting of monovinyl and monoisopropenyl derivatives of benzene and naphthalene and nuclear-substituted derivatives thereof in which the derivative groups have no more than a total of 12 carbon atoms and the derivative groups are selected from the class consisting of alkyl, aryl, cycloalkyl, alkaryl and aralkyl groups.

2. The process of claim 1 in which said reaction is performed at a temperature in the range of 30–50° C.

3. The process of claim 2 in which said reaction is carried out for a period of 1–6 hours.

4. The process of claim 3 in which said vinyl aryl compound is styrene.

5. The process of claim 4 in which an alkyl lithium is used.

6. The process of claim 5 in which said alkyl lithium is n-butyl lithium.

7. The process of claim 6 in which said secondary alkyl chloride is secondary butyl chloride.

8. The process of claim 6 in which said secondary alkyl chloride is secondary amyl chloride.

9. The process of claim 6 in which said secondary alkyl chloride is isopropyl chloride.

10. The process of claim 5 in which said preformed polymer is a butadiene homopolymer.

11. The process of claim 5 in which said preformed polymer is an isoprene homopolymer.

12. The process of claim 10 in which said homopolymer has a molecular weight of 30,000–120,000.

13. The process of claim 1 in which said preformed polymer has a molecular weight of 30,000–120,000.

14. The process of claim 1 in which said secondary alkyl chloride is used in a proportion of 10–25 millimoles per millimole of said alkyl lithium or alkyl sodium.

References Cited

UNITED STATES PATENTS

| 3,492,369 | 1/1970 | Naylor | 260—880 |
| 3,607,846 | 9/1971 | Halasa et al. | 260—94.7 |
| 3,719,730 | 3/1973 | Hansley | 260—94.7 |
| 3,661,873 | 5/1972 | Halasa et al. | 260—94.7 |

FOREIGN PATENTS

| 873,656 | 7/1961 | Great Britain | 260—877 |

JAMES A. SEIDLECK, Primary Examiner

U.S. Cl. X.R.

260—94.7 HA, 880 B

UNITED STATES PATENT OFFICE
CERTIFICATE OF CORRECTION

Patent No. 3,806,557     Dated April 23, 1974

Inventor(s) Adel F. Halasa

It is certified that error appears in the above-identified patent and that said Letters Patent are hereby corrected as shown below:

In Column 5, Line 69, "nM" should be --mM-- (both occurrences).

In Column 6, Line 16, "nM" should be --mM-- (both occurrences).

Signed and sealed this 24th day of September 1974.

(SEAL)
Attest:

McCOY M. GIBSON JR.
Attesting Officer

C. MARSHALL DANN
Commissioner of Patents